US008732223B2

(12) United States Patent
Yarman

(10) Patent No.: US 8,732,223 B2
(45) Date of Patent: May 20, 2014

(54) DERIVING A FUNCTION THAT REPRESENTS DATA POINTS

(75) Inventor: Can Evren Yarman, Houton, TX (US)

(73) Assignee: WesternGeco L.L.C., Houston, TX (US)

( * ) Notice: Subject to any disclaimer, the term of this patent is extended or adjusted under 35 U.S.C. 154(b) by 1152 days.

(21) Appl. No.: 12/693,122

(22) Filed: Jan. 25, 2010

(65) Prior Publication Data
US 2010/0198897 A1    Aug. 5, 2010

Related U.S. Application Data

(60) Provisional application No. 61/148,794, filed on Jan. 30, 2009.

(51) Int. Cl.
*G06F 1/02*       (2006.01)
*G06F 17/17*      (2006.01)

(52) U.S. Cl.
CPC ....................................... *G06F 17/17* (2013.01)
USPC ........................................................ 708/270

(58) Field of Classification Search
None
See application file for complete search history.

(56) References Cited

U.S. PATENT DOCUMENTS

| 6,038,197 A | 3/2000 | Sitton et al. |
| 6,636,804 B1 | 10/2003 | Joshi |
| 2004/0239323 A1 | 12/2004 | Taylor et al. |
| 2006/0095236 A1* | 5/2006 | Phillips ............................... 703/2 |
| 2007/0214202 A1* | 9/2007 | Beylkin ........................ 708/290 |
| 2009/0184958 A1 | 7/2009 | Osypov et al. |

FOREIGN PATENT DOCUMENTS

WO       2005062196 A2    7/2005

OTHER PUBLICATIONS

PCT Search Report, dated Sep. 3, 2010, Application No. PCT/US2010/022033.
Beylkin, et al., On Approximation of Functions by Exponential Sums, Elsevier Science, Feb. 2005.
Beylkin, et al., On Approximation of Functions by Exponential Sums, Appl. Comput. Harmon. Anal., 2005, pp. 17-48, vol. 19.
Gaussian Quadrature—Wikipedia, the free encyclopedia, Jan. 11, 2010.
Vandermonde Matrix, Wikipedia, the free encyclopedia, Jan. 11, 2010.

* cited by examiner

*Primary Examiner* — Henry Tsai
*Assistant Examiner* — Aurangzeb Hassan

(57) ABSTRACT

A function that represents data points is derived by creating a matrix (e.g., a Hankel matrix) of an initial rank, where the matrix contains the data points. Singular values are derived based on the matrix, and it is determined whether a particular one of the singular values satisfies an error criterion. In response to determining that the particular singular value does not satisfy the error criterion, the rank of the matrix is increased and the deriving and determining tasks are repeated. In response to determining that the particular singular value satisfies the error criterion, values of parameters that approximate the function are computed.

18 Claims, 3 Drawing Sheets ered. In other implementations, instead of survey data points, other types of data points can be collected for other applications, such as data points relating to measurements made in a computer network, data points relating to web traffic, data points relating to electronic commerce purchases, and so forth.

DERIVING A FUNCTION THAT REPRESENTS DATA POINTS

CROSS REFERENCE TO RELATED APPLICATIONS

This application claims the benefit under 35 U.S.C. §119 (e) of U.S. Provisional Application Ser. No. 61/148,794 entitled "INTERPOLATION USING EXPONENTIALS AND RANK ONE UPDATES," filed Jan. 30, 2009, which is hereby incorporated by reference.

BACKGROUND

When performing surveying of a subterranean structure for identifying subterranean bodies of interest, data points are collected by survey receivers in response to a stimulus. The survey receivers can be electromagnetic (EM) receivers or seismic receivers. In other applications, data points can be collected in other contexts, such as data points collected based on monitoring performed in a computer network, data points relating to electronic commerce purchases or web traffic, and so forth.

Often, to better understand the collected data points, it may be desirable to derive functions that represent the collected data points. However, such functions can be relatively complex such that deriving such functions can be processing-intensive and time-consuming.

SUMMARY

In general, in accordance with an embodiment, a method of deriving a function that represents data points includes creating a matrix (e.g., a Hankel matrix) of an initial rank, where the matrix contains the data points. Singular values of the matrix are computed, and it is determined whether a particular one of the singular values satisfies an error criterion. In response to determining that the particular singular value does not satisfy the error criterion, the rank of the matrix is increased and the deriving and determining tasks are repeated. In response to determining that the particular singular value satisfies the error criterion, values of parameters that form the function are computed.

Other or alternative features will become apparent from the following description, from the drawings, and from the claims.

BRIEF DESCRIPTION OF THE DRAWINGS

Some embodiments of the invention are described with respect to the following figures.

DETAILED DESCRIPTION

In general, techniques or mechanisms are provided to derive a function that (approximately) represents data points collected by an application. The application can be a surveying application, in which data points are collected by survey receivers in response to stimuli applied to a subterranean structure. The data points collected by the survey receivers are analyzed for understanding subterranean elements contained in the subterranean structure. Examples of surveying that can be performed include electromagnetic (EM) surveying or seismic surveying. In other implementations, instead of survey data points, other types of data points can be collected for other applications, such as data points relating to measurements made in a computer network, data points relating to web traffic, data points relating to electronic commerce purchases, and so forth.

In some cases, to better understand the collected data points, it may be desirable to derive a function, $f(t)$, that (approximately) represents the data points. A function that "approximately" represents the data points is a function that may not fit the data points exactly. Some interpolation is performed based on the data points to arrive at the function. In some embodiments, this function, $f(t)$, is a sum of exponentials, as discussed in greater detail below. Note that the data points can be measurements, or alternatively, can be samples from other functions different from $f(t)$.

In many cases, particularly when the functions, $f(t)$, to be approximated are relatively complex, performing the approximation of functions can be a relatively complicated task that can be processing-intensive and time-consuming. In accordance with some embodiments, techniques for approximating a function that represents data points uses an algorithm that is more efficient than conventional algorithms.

Figure 1:
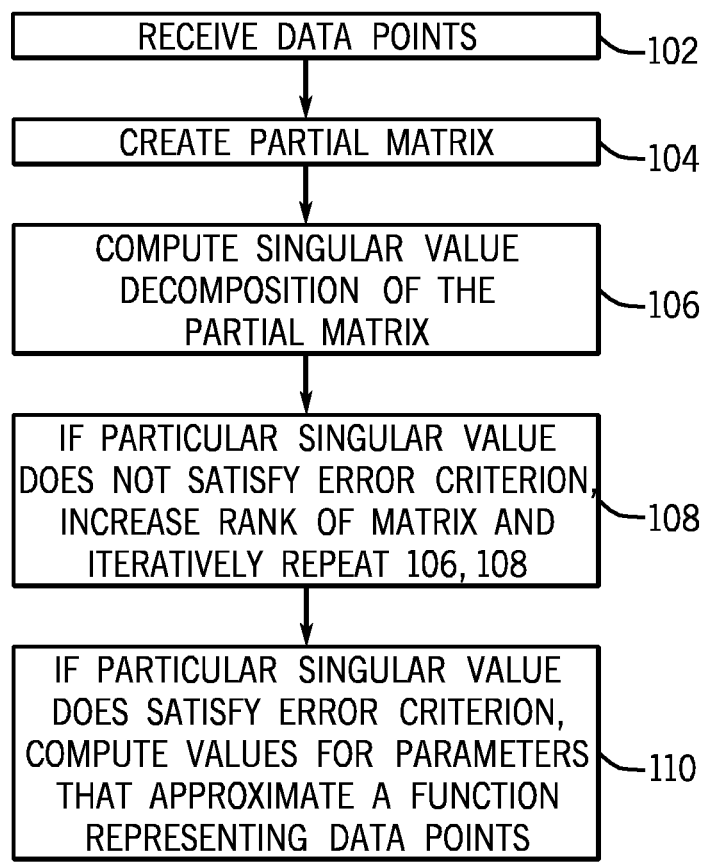
FIG. 1 is a flow diagram of a general process of approximating a function that represents data points, according to some embodiments.
Figure 2:
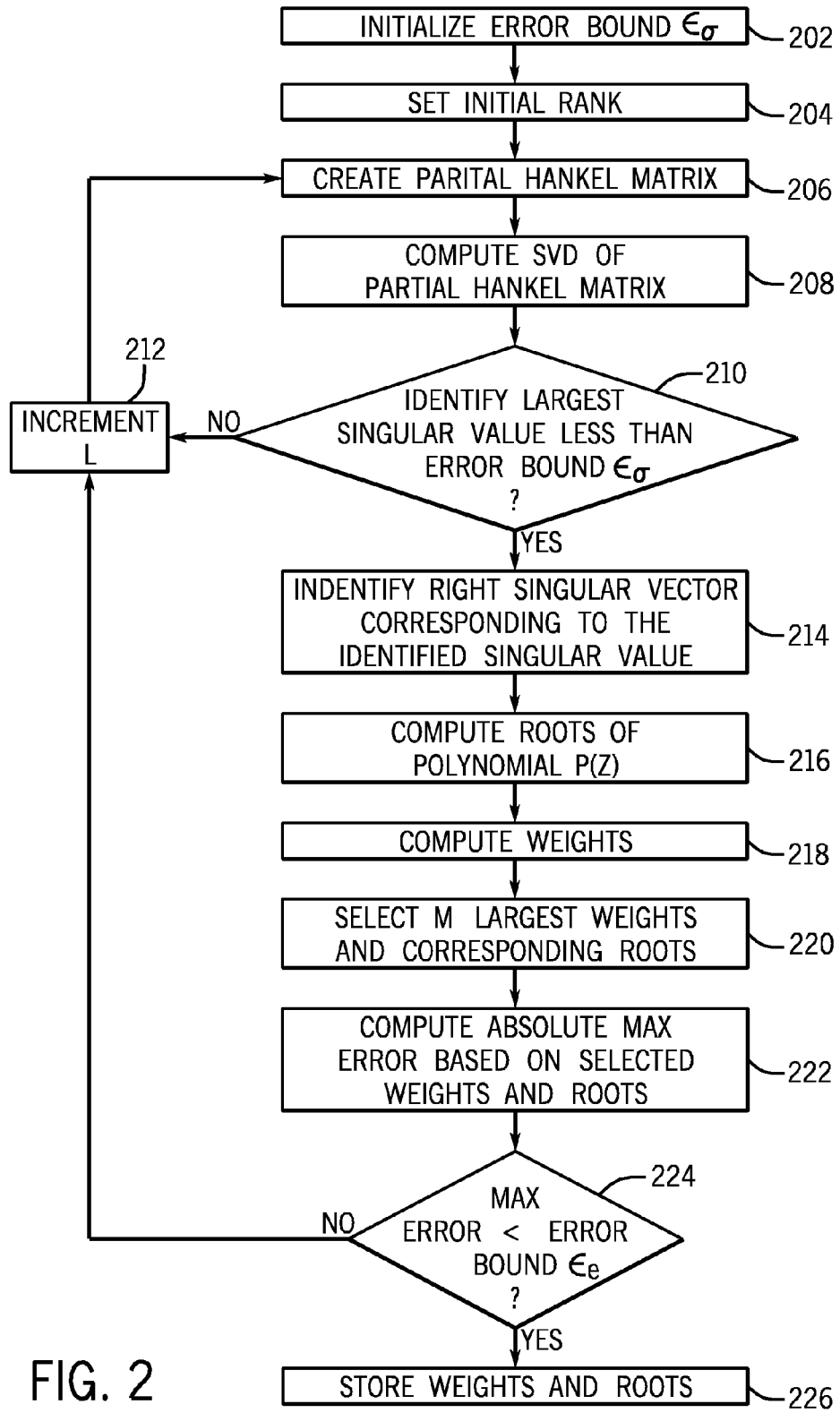
FIG. 2 is a flow diagram of a process of approximating a function that represents data points, according to further embodiments.

In some embodiments, as shown in FIG. 1, given an input set of data points received (at 102) by a particular application, a partial Hankel matrix is created (at 104) having an initial rank, where the initial rank can be the rank of two or greater. The partial Hankel matrix contains some of the input data points. Although reference is made to a Hankel matrix in the ensuing discussion, it is noted that other types of matrices can be used in other embodiments. For example, a partial Toeplitz matrix can be used instead.

Once the Hankel matrix (or other type of matrix) is created, singular value decomposition (SVD) of the partial Hankel matrix is computed (at 106). The SVD of the partial Hankel matrix produces three matrices: a left singular matrix, a diagonal matrix, and a right singular matrix. The diagonal matrix includes singular values along the diagonal of the diagonal matrix. In accordance with some embodiments, it is determined whether a particular one of the singular values in the diagonal matrix satisfies an error criterion. In some embodiments, this particular singular value is the largest singular value that satisfies the error criterion. Determining whether the particular singular value satisfies the error criterion includes determining whether the singular value is less than an error bound (threshold) $\epsilon_o$.

If it is determined that the particular singular value does not satisfy the error criterion, then the rank of the Hankel matrix is increased (at 108), and tasks 106 and 108 are iteratively repeated—in other words, the SVD is again applied (at 106) to the partial Hankel matrix (with increased rank) to derive a new diagonal matrix with new singular values, and the rank is again increased (at 108) if the particular singular value still does not satisfy the error criterion. The above process is iteratively performed until it is determined that the particular singular value of the derived diagonal matrix satisfies the error criterion, at which point values for parameters that form the function are computed (at 110).

A Hankel matrix is discussed below. Given an input set of data points $h_0, h_1, \ldots, h_{2N}$ (which can be measurements or samples from a function), where N is an integer greater than or equal to 1, a full Hankel matrix H is represented as follows:

$$H = \begin{bmatrix} h_0 & h_1 & \ldots & & h_N \\ h_1 & \ldots & & & h_{N+1} \\ \vdots & & & & \vdots \\ & \ldots & & \ldots & h_{2N-1} \\ h_N & \ldots & & h_{2N-1} & h_{2N} \end{bmatrix}.$$

In the full Hankel matrix H represented above, the first row of the Hankel matrix H contains the first N+1 data points, represented as $h_0, h_1, \ldots, h_N$. The second row of the Hankel matrix H includes the data points of the first row shifted to the left by one data point (such that $h_0$ is removed in the second row), but an additional data point $h_{N+1}$ is added to the last entry of the second row. The left shifting of data points continues in the subsequent rows of the Hankel matrix H to the last row, where the last row includes $h_N, h_{N+1}, \ldots, h_{2N}$.

More specifically, the Hankel matrix H contains an array of elements $H_{kl}$, where k represents a row number, and l represents a column number. Each matrix element $H_{kl}$ has data point $h_{k+l}$, for $k+l \leq 2N$.

Instead of applying algorithms according to some embodiments to the full Hankel matrix H, some embodiments of the invention apply algorithms to partial Hankel matrices. Given an input set of data points $h_0, h_1, \ldots, h_N$ where N is an integer greater than or equal to 1, a partial Hankel matrix $H_L$ with rank L, where L is an integer smaller or equal to N-L, is represented as follows:

$$H_L = \begin{bmatrix} h_0 & h_1 & h_2 & \ldots & h_L \\ h_1 & h_2 & & & h_{L+1} \\ \vdots & \vdots & & & \vdots \\ h_{N-L-1} & h_{N-L} & h_{N-L+1} & \ldots & h_{N-1} \\ h_{N-L} & h_{N-L+1} & \ldots & \ldots & h_N \end{bmatrix}$$

SVD refers to a factorization of a rectangular real or complex matrix. Performing an SVD on the matrix H results in a factorization in the following form: $H = V\Sigma U^T$, where V is a left singular matrix and U is a right singular matrix. The matrix $\Sigma$ is a diagonal matrix with singular values along the diagonal. $U^T$ represents the conjugate transpose of U.

A function (for representing data points) to be derived is given by $f(t)$. The data points are given by $h_k$ for $k=0, \ldots, N$. In accordance with some embodiments, a technique is provided to approximate $h_k$ in terms of exponential sums:

$$h_k \approx \sum_{m=1}^{M} \alpha_m \gamma_m^k \quad \text{(Eq. 1)}$$

Then the function $f(t)$ is interpolated for $t \in [0,N]$ by $$f(t) = \sum_{m=1}^{M} \alpha_m \gamma_m^t \quad \text{(Eq. 2)}$$

Eq. 2 thus indicates that the function $f(t)$ is represented as a sum of exponentials (or Gaussian quadratures in Eq. 2). In Eq. 2, $[\alpha_m \gamma_m]$ represents a Gaussian quadrature, which is a type of quadrature formula in which the nodes $\gamma_m$ are selected to produce an accurate result with a minimal number of nodes. The parameters $\alpha_m$ represent weights.

In accordance with some embodiments, to compute the nodes and the weights of Eq. 2, a full Hankel matrix H does not have to be used. Instead, the algorithm according to some embodiments starts with a partial Hankel matrix $H_L$ of rank L.

The following sets forth a more detailed discussion of the algorithm used for deriving a function for representing data points, in accordance with some embodiments. An error bound (or threshold) $\epsilon_o$, is initialized (at 202). Next, the initial rank L of the partial Hankel matrix to be derived is selected (at 204). The procedure then creates (at 206) the partial Hankel matrix of rank L, where the partial Hankel matrix $H_L$ contains some of the data points of the input set.

The procedure next computes (at 208) the SVD of the partial Hankel matrix, as follows: $H_L = V\Sigma U^T$, where the diagonal matrix $\Sigma$ contains singular values $(\sigma_0, \sigma_1, \ldots, \sigma_L)$ along its diagonal. The procedure next identifies (at 210) the largest singular value $(\sigma_\epsilon)$ from among the singular values in the diagonal matrix $\Sigma$ that is less than the error bound $\epsilon_o$. If there is no such singular value, the rank L is incremented (at 212), and tasks 206, 208, and 210 are repeated. The process involving tasks 206, 208, 210, and 212 are iteratively performed until the largest singular value $(\sigma_\epsilon)$ from among the singular values of the diagonal matrix $\Sigma$ is less than the error bound $\epsilon_o$.

The singular values in the diagonal matrix $\Sigma$ have a minimum singular value $\sigma_{min}$. The singular value $\sigma_\epsilon$, identified at 210 has a corresponding index M, i.e. $\sigma_\epsilon = \sigma_M$. Note that $\sigma_\epsilon$, can be the same as or different from $\sigma_{min}$, whose index is L, i.e. $\sigma_{min} = \sigma_L$.

The procedure then identifies (at 214) a vector from the right singular matrix ($U^T$) that corresponds to $\sigma_\epsilon$. The identified vector of the right singular matrix contains coefficients $p_l$, where $p_l$ is the l-th element of the identified vector from the right singular matrix.

Based on the coefficients $p_l$, the roots $\eta$ of the polynomial $$P_{q\epsilon}(z) = \sum_{l=0}^{L} p_l z^l$$

are computed (at 216), where $p_l$, is the l-th element of the right singular matrix vector corresponding to the singular value $\sigma_\epsilon$. The roots $\eta$ are equal to $\gamma_m$ in Eq. 2.

Next, the weights $\alpha_m$ of Eq. 2, $$f(t) = \sum_{m=1}^{L} \alpha_m \gamma_m^t,$$

are computed (at 218) by solving a Vandermode system, $$h_k \approx \sum_{m=1}^{L} \alpha_m \gamma_m^k,$$

for example. In some implementations, the Vandermode system can be solved by using a least squares quadratic relaxation (LSQR) algorithm. In other implementations, other techniques can be used to compute the weights.

Next the M absolutely largest weights $\alpha_m$ and the corresponding roots $\gamma_m$ are selected (at 220). Next, in some embodiments, based on the M largest weights $\alpha_m$ and the corresponding roots $\gamma_m$, an absolute max error e is computed (at 222), as follows:

$$e = \max\left|h_k - \sum_{m=1}^{M} \alpha_m \gamma_m^k\right|.$$

The procedure then determines (at 224) whether the max error e is less than an error bound $\epsilon_e$ (which may equal to or different from the error bound $\epsilon_o$, discussed above). If not, then the rank L is incremented, and the tasks 206-224 are repeated. On the other hand, if the max error e is less than the error bound $\epsilon_e$, then the weights $\alpha_m$ and corresponding roots (computed at 218 and 216, respectively) are stored (at 228), from which the function ($f(t)$) as represented by Eq. 2 is readily derived.

Algorithms for deriving $f(t)$ according to some embodiments are computationally less intensive than conventional algorithms, since the algorithms are applied based on SVDs of partial Hankel matrices. Moreover, in accordance with some embodiments, stable information regarding locations of quadrature nodes does not have to be known a priori for the algorithms to be stable.

Figure 3:
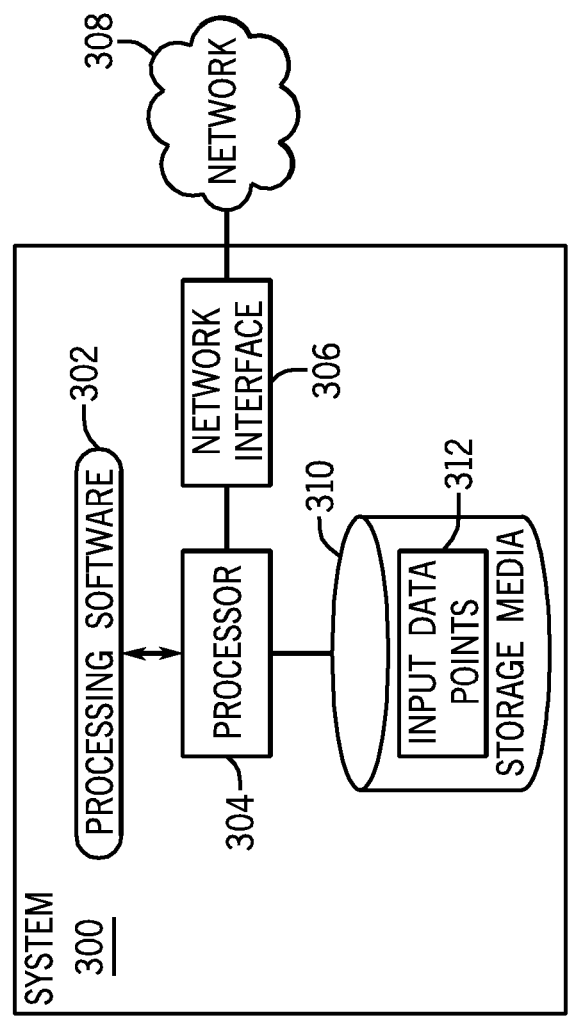
FIG. 3 is a block diagram of an example system that incorporates some embodiments of the invention.

FIG. 3 illustrates an example system 300, which can be implemented with a computer or an arrangement of computers. The system 300 includes processing software 302 that is executable on a processor 304. The processor 304 is connected to a network interface 306 to allow the system 300 to communicate over a network 308.

The processor 304 is connected to storage media 310, which can be implemented with semiconductor-based storage media or disk-based storage media. The storage media 310 stores input data points 312 that are received over the network 308 through the network interface 306.

The processing software 302 is executable to perform the approximation of a function representing data points, as discussed in detail above.

Instructions of the processing software 302 are loaded for execution on the processor 304. The processor 304 can include a microprocessor, a microcontroller, a processor module or subsystem (including one or more microprocessors or microcontrollers), or another control or computing device. As used here, a "processor" can refer to a single component or to plural components (e.g., one CPU or multiple CPUs).

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method of deriving a function that represents data points, comprising:

creating, by a processor, a matrix of an initial rank, wherein the matrix contains the data points;

deriving, by the processor, singular values based on the matrix;

determining, by the processor, whether a particular one of the singular values satisfies an error criterion;

in response to determining that the particular singular value does not satisfy the error criterion, increasing the rank of the matrix and repeating the deriving and determining; and in response to determining that the particular singular value satisfies the error criterion, computing, by the processor, values of parameters that approximate the function.

2. The method of claim 1, wherein increasing the rank of the matrix is iterated and the deriving and determining are repeated after each increase of the rank of the matrix until the particular singular value satisfies the error criterion.

3. The method of claim 1, wherein creating the matrix comprises creating a partial Hankel or Toeplitz matrix of the initial rank, wherein the initial rank is rank 2 or greater.

4. The method of claim 1, wherein determining whether the particular singular value satisfies the error criterion comprises identifying the largest of the singular values that is less than an error bound.

5. The method of claim 4, wherein deriving the singular values comprises deriving a diagonal matrix containing the singular values, the method further comprising:

producing a left singular matrix and a right singular matrix, wherein vector multiplication of the left singular matrix, the diagonal matrix, and the right singular matrix produces the matrix of the initial or increased rank.

6. The method of claim 5, wherein deriving the diagonal matrix is based on computing a singular value decomposition of the matrix having the initial or increased rank.

7. The method of claim 1, wherein computing the values of the parameters comprises:

identifying a largest of the singular values that is less than an error bound of the error criterion;

identifying a vector of coefficients corresponding to the identified singular value;

computing roots of the function using the coefficients of the identified vector; and computing the values of the parameters based on the computed roots.

8. The method of claim 7, wherein the roots in combination with the parameters form a sum of exponentials that approximate the function.

9. The method of claim 8, wherein the data points include data points $h_0, h_1, \ldots, h_N$, wherein the function is represented as $f(t)$, wherein the function $f(t)$ is derived according to $$f(t) = \sum_{m=1}^{M} \alpha_m \gamma_m^t,$$

M computed based on the rank of the matrix, wherein $\alpha_m$, m=1 to M, represent the parameters, and $\gamma_m$, m=1 to M, represent the roots.

10. An article comprising at least one computer-readable storage medium storing instructions that upon execution cause a processor to:
   create a partial matrix of an initial rank, wherein the partial matrix is one of a partial Hankel matrix or Toeplitz matrix;
   apply a singular value decomposition to the partial matrix to produce a diagonal matrix having singular values;
   determine whether a particular one of the singular values satisfies an error criterion;
   in response to determining that the particular singular value does not satisfy the error criterion, increase the rank of the partial matrix and repeat the applying and determining after the increase of the rank; and
   in response to determining that the particular singular value satisfies the error criterion, compute parameters to derive a function that represents the data points.

11. The article of claim 10, wherein the function is a sum of exponentials parameterized by Gaussian quadratures.

12. The article of claim 10, wherein applying the singular value decomposition to the partial matrix further produces a left singular matrix and a right singular matrix, wherein vector multiplication of the left singular matrix, the diagonal matrix, and the right singular matrix produces the partial matrix.

13. The article of claim 10, wherein the instructions upon execution by the processor cause the processor to further:
   iterate the increasing of the rank of the partial matrix and repeating the applying and determining after each increase of the rank, until a particular singular value satisfies the criterion.

14. The article of claim 13, wherein the criterion comprises an error bound, and wherein the particular singular value is the largest singular value that is less than the error bound.

15. The article of claim 10, wherein computing the parameters comprises computing roots and weights of the function, wherein the function is a sum of products of powers of respective roots and weights.

16. A system comprising:
   a processor; and
   a processing software executable on the processor to:
      create a matrix of an initial rank, wherein the matrix contains the data points;
      derive singular values based on the matrix;
      determine whether a particular one of the singular values satisfies an error criterion;
      in response to determining that the particular singular value does not satisfy the error criterion, increase the rank of the matrix and repeating the deriving and determining; and
      in response to determining that the particular singular value satisfies the error criterion, compute values of parameters that approximate the function.

17. The system of claim 16, wherein the matrix is a partial Hankel matrix or a partial Toeplitz matrix, wherein the initial rank is represented as L.

18. The system of claim 16, wherein the singular values are derived based on computing a singular value decomposition of the matrix.

* * * * *